United States Patent [19]

Platteter et al.

[11] Patent Number: 5,018,143
[45] Date of Patent: May 21, 1991

[54] FAULT DIAGNOSING AND IDENTIFICATION SYSTEM FOR REPRODUCTION MACHINES

[75] Inventors: Dale T. Platteter, Fairport; Robert S. Westfall, Rochester, both of N.Y.

[73] Assignee: Xerox Corporation, Stamford, Conn.

[21] Appl. No.: 471,148

[22] Filed: Jan. 26, 1990

Related U.S. Application Data

[63] Continuation of Ser. No. 255,658, Oct. 13, 1988, abandoned.

[51] Int. Cl.⁵ .............................................. G06F 11/00
[52] U.S. Cl. ..................................... 371/16.4; 371/29.1
[58] Field of Search .................... 371/16.4, 16.1, 29.1, 371/15.1; 340/715, 815.03; 355/203, 204, 206, 207, 209; 364/200, 900, 525

[56] References Cited

U.S. PATENT DOCUMENTS 3,964,018  6/1976  Strait ................................ 371/28 X
4,135,662  1/1979  Dlugos ............................. 371/29.1
4,475,196 10/1984  La Zor ............................. 371/29.1

OTHER PUBLICATIONS

M. R. Wojtaszek, "Testing Digital Counting", IBM TDB, vol. 17, No. 5, 10/1974, p. 1439.
E. L. Allen et al., "Error Indicator for CRT Display", IBM TDB, vol. 10, No. 1, 6/1967, p. 16.

*Primary Examiner*—Jerry Smith
*Assistant Examiner*—Robert W. Beausoliel
*Attorney, Agent, or Firm*—Frederick E. McMullen

[57] ABSTRACT

A fault diagnosing and identification system for reproduction machines in which LEDs are provided on the core PWBs, individual LEDs being activated in predetermined on/off sequences to identify both a faulty PWB and the specific fault itself.

5 Claims, 9 Drawing Sheets

FAULT DIAGNOSING AND IDENTIFICATION SYSTEM FOR REPRODUCTION MACHINES

This is a continuation, of application Ser. No. 07/255,658, filed 10/13/88 now abandoned.

BACKGROUND OF THE INVENTION

The invention relates to reproduction machines, and more particularly, to a system for diagnosing and identifying faults.

Reproduction machines may incorporate a distributed processing system in which a number of core processors are used to handle and distribute operating control data to the various operating components of the machine. In that type of system, in addition to the core processors, there is usually a plurality of local or input-/output processors interfacing their respective core processors with the machine components.

Typically, such core processors have on-board memory to which a portion of the operating system software is downloaded for machine operation. The operating system software is normally resident in the machine main memory and transferred to the core processors on start up of the machine. The processors themselves are in the form of Printed Wiring Boards (PWBs) located at convenient points within the machine and coupled to the machine memory store by a suitable line or bus. Similarly, the input/output processors are coupled to their respective core processors and each other by local buses.

The core processors have numerous operating states such as running, downloading, receiving/transmitting messages, failed, etc. Because of this, it is often difficult to tell what state a processor is in at any given moment should there be a problem or fault. This in turn makes it difficult to debug faults in the system, and particularly in the core processors themselves since it is difficult to isolate the particular processor at fault and having done that, to identify the particular fault. The problem is exacerbated by the fact that most faults are transient in nature requiring that the fault detector be under surveillance at the instant the fault occurs.

The prior art has addressed fault detection in a number of different ways as, for example, shown in U.S. Pat. No. 4,665,519 to Kirchner et al. There, a computer data transmission system with modems provides a network. To assure transmission of data, the data is sent in packets, each with validation bits. On receipt, the station receiving the data checks to see if the packet is correct and if so, sends an acknowledgment signal. If the data is not correct, no acknowledgment is sent and in response to a failure to receive an acknowledgment, the transmitting station retransmits the packet. If the packet cannot be validated after a selected number of transmissions, a fault is declared. Another arrangement is disclosed by U.S. Pat. No. 4,710,929 to Kelly et al where a modem is provided with display having a panel of Light Emitting Diodes (LEDs). In Kelly et al, the LEDs are illuminated in response to a particular data carrier detect signal to indicate that the modem is in use. Yet another system is disclosed by U.S. Pat. No. 4,580,274 to Debany, Jr. et al wherein a transceiver test device analyzing transient waveforms through comparison with pre-stored waveforms is provided. A panel of uniquely assigned LEDs on the device are illuminated in the event the waveform is incorrect. And U.S. Pat. No. 3,585,629 to Baynard provides a lamp array for displaying the contents of computer storage registers during servicing. In order to enable the user to distinguish different words at each of the bit positions being examined, the power source for the lamps of the array provides different lamp illumination levels ranging from dim to bright to flickering.

SUMMARY OF THE INVENTION

The present invention is concerned with an improved process for diagnosing and identifying faults in a reproduction machine having a plurality of image processing components, an operating system providing control data for operating the components; memory means for storing the operating system; and control means including plural printed wiring boards coupled by a shared line with the memory means for implementing operation of the machine in accordance with the operating system, with each of the boards having plural fault indicating lamps, the process including the steps of: continuously pulsing a first of the lamps on each of the boards to indicate that the operating system is running; toggling a second of the lamps on each of the boards to show each time a message is received on the shared line; toggling a third of the lamps on the boards to show each time a message is transmitted from the boards to the shared line; and where a fault in one of the boards is detected, pulsing at least two of the lamps simultaneously on the boards at a predetermined rate representative of the fault detected.

DETAILED DESCRIPTION OF THE DRAWINGS

For a better understanding of the present invention, reference may be had to the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE PREFERRED EMBODIMENT

Figure 1:
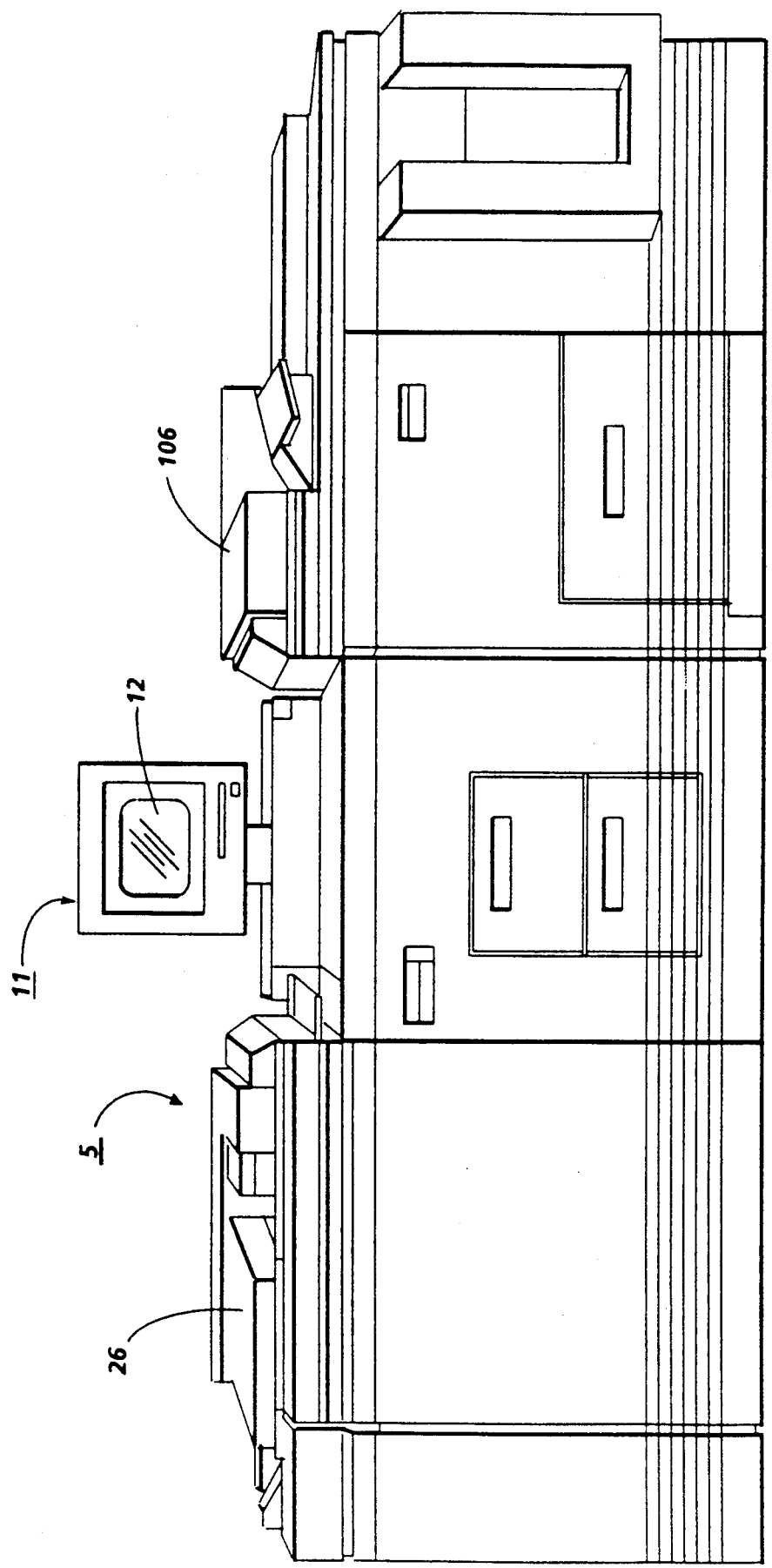
FIG. 1 is an isometric view of an illustrative reproduction machine incorporating the fault diagnosing and identifying system of the present invention.
Figure 2:
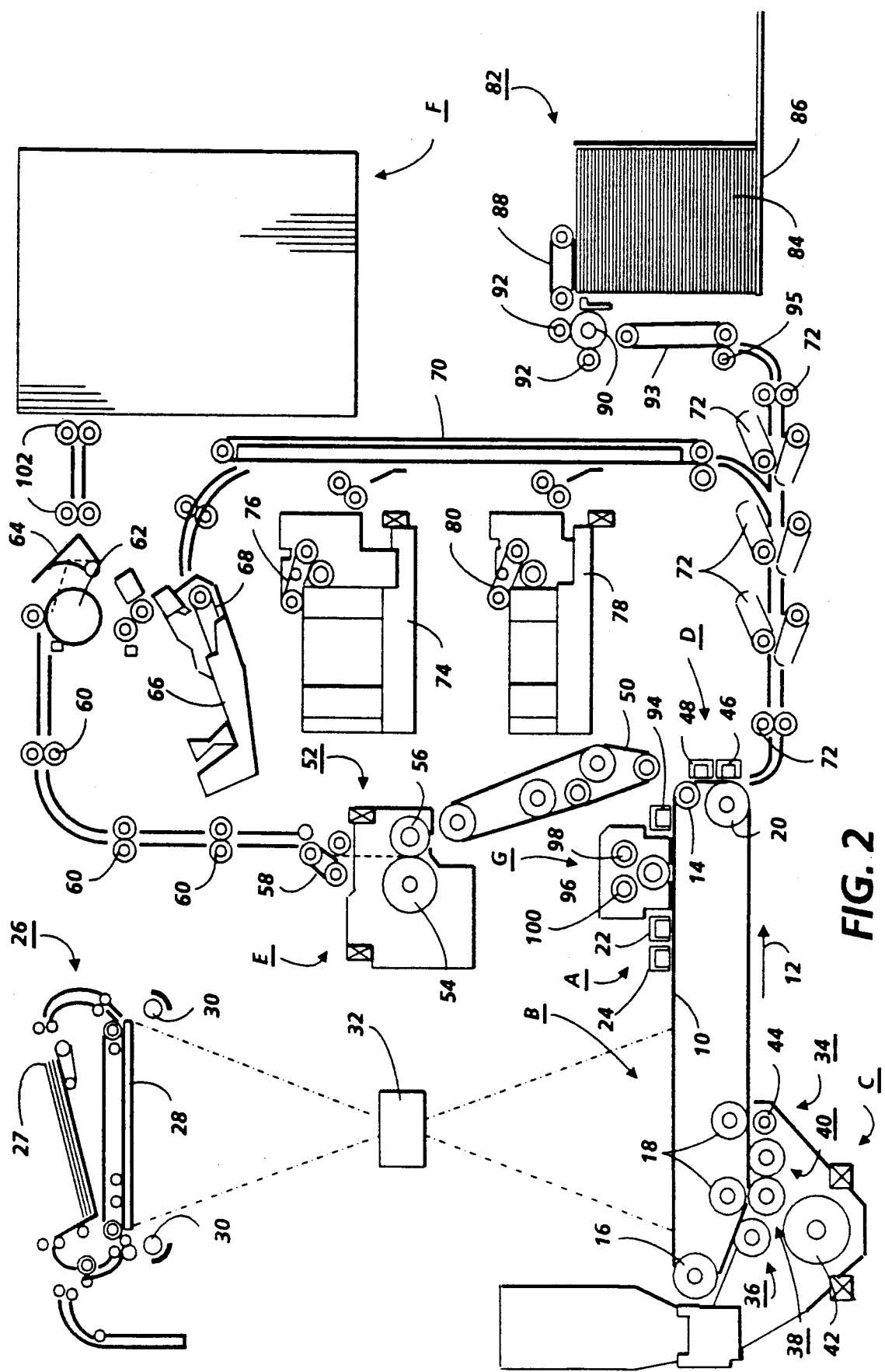
FIG. 2 is a schematic elevational view depicting various operating components and sub-systems of the machine shown in FIG. 1.
Figure 3:
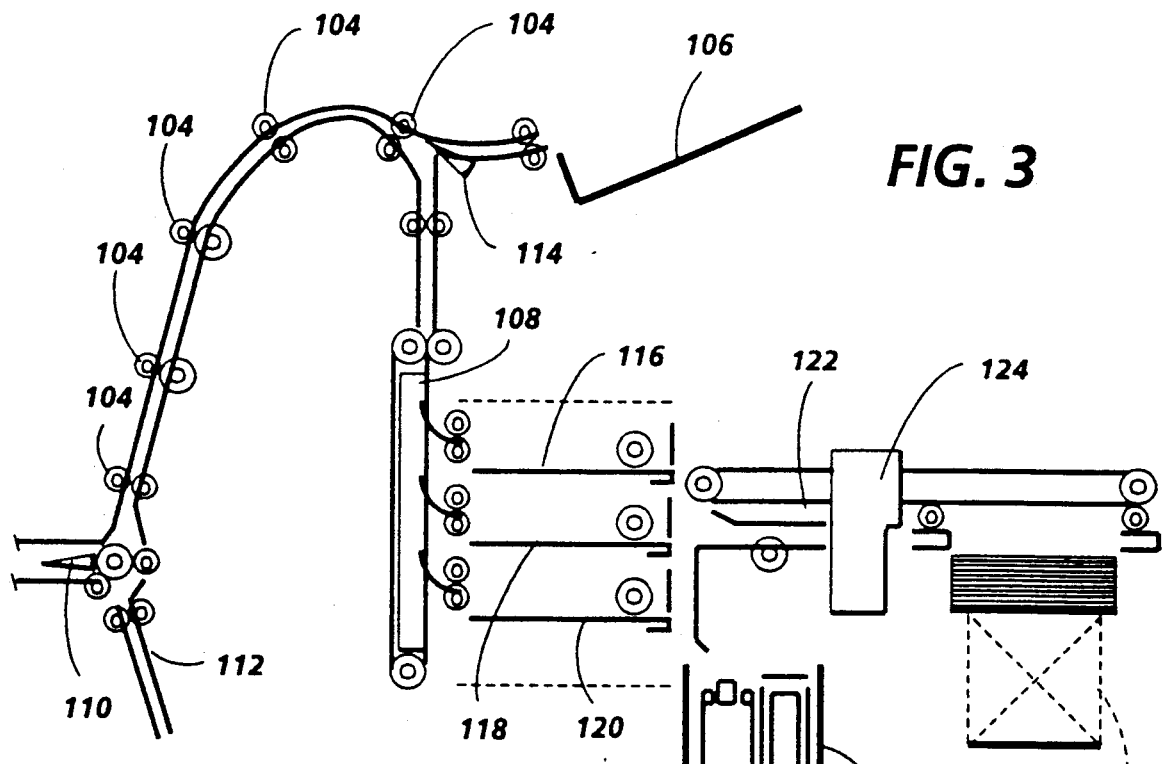
FIG. 3 is a schematic elevational view showing the finishing sub-system of the machine shown in FIG. 1.

For a general understanding of the features of the present invention, reference is made to the drawings. In the drawings, like reference numerals have been used throughout to identify identical elements. Referring to FIGS. 1, 2, and 3, there is shown an electrophotographic reproduction machine 5 composed of a plurality of programmable components and sub-systems which cooperate to carry out the copying or printing job programmed through a touch dialogue screen 12 of a User Interface (U.I.) 11.

Machine 5 has a photoconductive belt 10 entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B.

At imaging station B, an automatic document handler 26 sequentially feeds documents from a stack of documents 27 in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, conveyor 50 of paper handling module 7 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding roller 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finisher/binder module 8.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a precharge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

Finishing station F receives fused copies from rolls 102 (FIG. 2) and delivers them to gate 110. Gate 110 diverts the copy sheet to either registration rolls 104 or inverter 112. Copy sheets diverted to rolls 104 are advanced to gate 114 which diverts the sheets to either the top tray 106 or to vertical transport 108. Transport 108 transports sheets to any one of three bins 116, 118 or 120 which are used to compile and register sheets into sets. The bins are driven up or down by a bidirectional motor adapted to position the proper bin at the unloading position where a set transport 122 having a pair of set clamps is used to grasp and transport sets from the bins to either sheet stapling apparatus 124 when it is desired to staple the sets, or to binder 126 when it is desired to bind the sets, or to stacker 128 when unfinished sets are desired.

Figure 4:
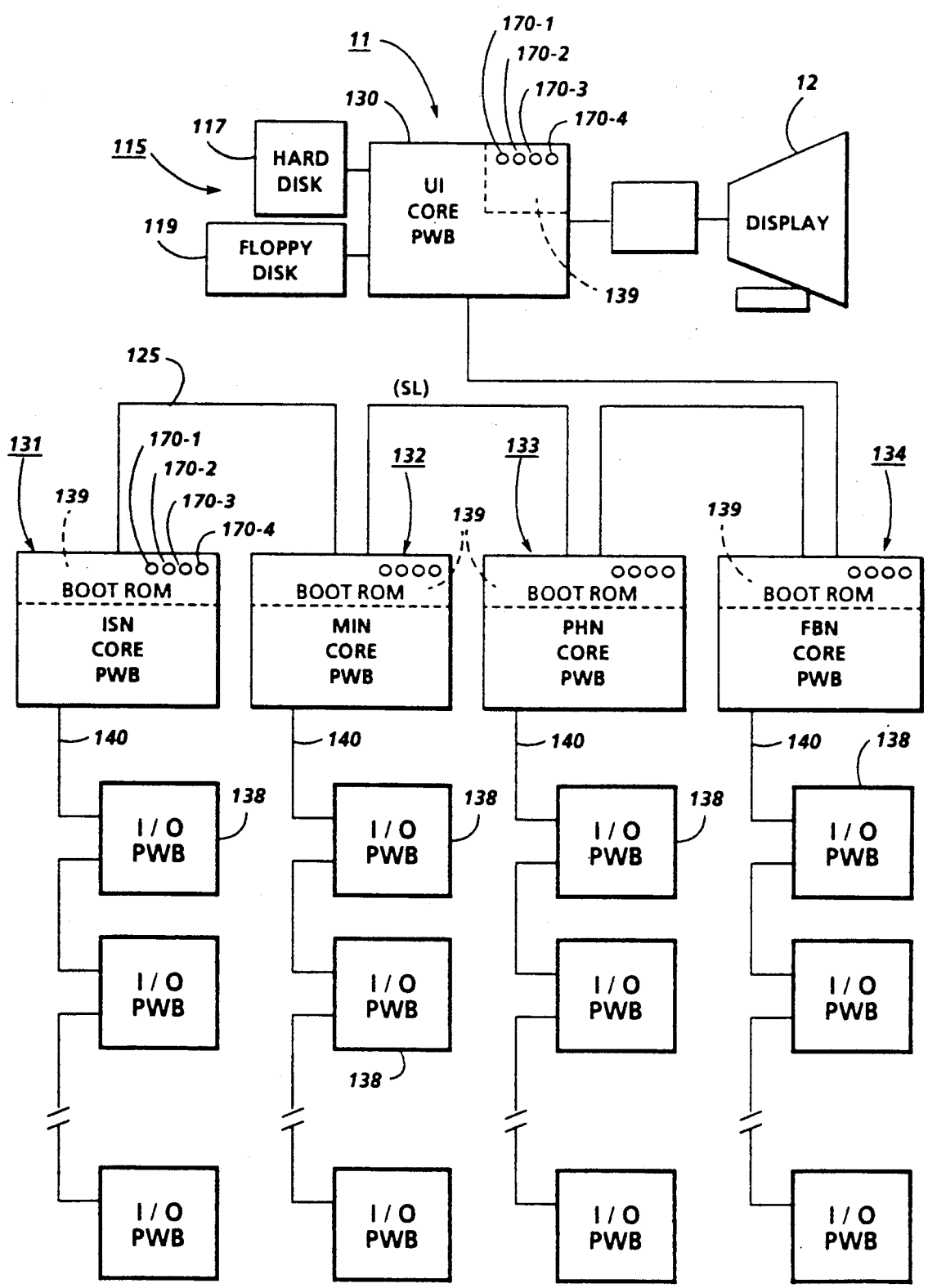
FIG. 4 is a more detailed block diagram depicting core Printed Wiring Boards (PWBs) with shared line connection to each other and the machine memory and subsidiary PWBs with local bus connection to the core PWBs and each other.

Referring to FIG. 4, operation of the various components of machine 5 is regulated by a control system which implements Operating System (OS) software stored in memory 115 to operate the various machine components in an integrated fashion to produce copies. The control system includes a plurality of printed wiring boards (PWBs), there being a UI core PWB 130, an Input Station Node (ISN) core PWB 131, a Marking Imaging Node (MIN) core PWB 132, a Paper Handling Node (PHN) core PWB 133, and a Finisher Binder Node (FBN) core PWB 134 together with various Input/Output (I/O) PWBs 138. A Shared Line (SL) 125 couples the core PWBs 130, 131, 132, 133, 134 with each other and with memory 115 while local buses 140 serve to couple the I/O PWBs 138 with each other and with their associated core PWB. Programming and operating control over machine 5 is accomplished through touch dialogue screen 12 of UI 11.

Memory 115 includes a main memory in the form of a hard or rigid disk 117 on which the machine OS is stored. On machine power up, the OS is loaded from memory 115 to UI core PWB 130 and from there to the remaining core PWBs 131, 132, 133, 134 via SL 125. Disk 117 preferably comprises two platter, four head disks with a formatted storage capacity of approximately 20 megabytes. Additional ROM, RAM, and NVM memory types are resident at various locations within machine 5, with each core PWB 130, 131, 132, 134 having a boot ROM 139 for controlling downloading of OS software to the PWB, fault detection, etc. Boot ROMs 139 also enable transmission of OS software and control data to and from PWBs 130, 131, 132, 134 via SL 125 and control data to and from I/O PWBs 138 via local buses 140.

A floppy disk port provides program loading access to memory 115 for the purpose of entering changes to the OS, loading specific programs such as diagnostic programs, retrieving stored data such as machine faults, etc. using floppy disks 119. Floppy disks 119 preferably comprise 3.5 inch, dual sided micro disks with a formatted storage capacity of approximately 720 kilobytes.

Figure 5:
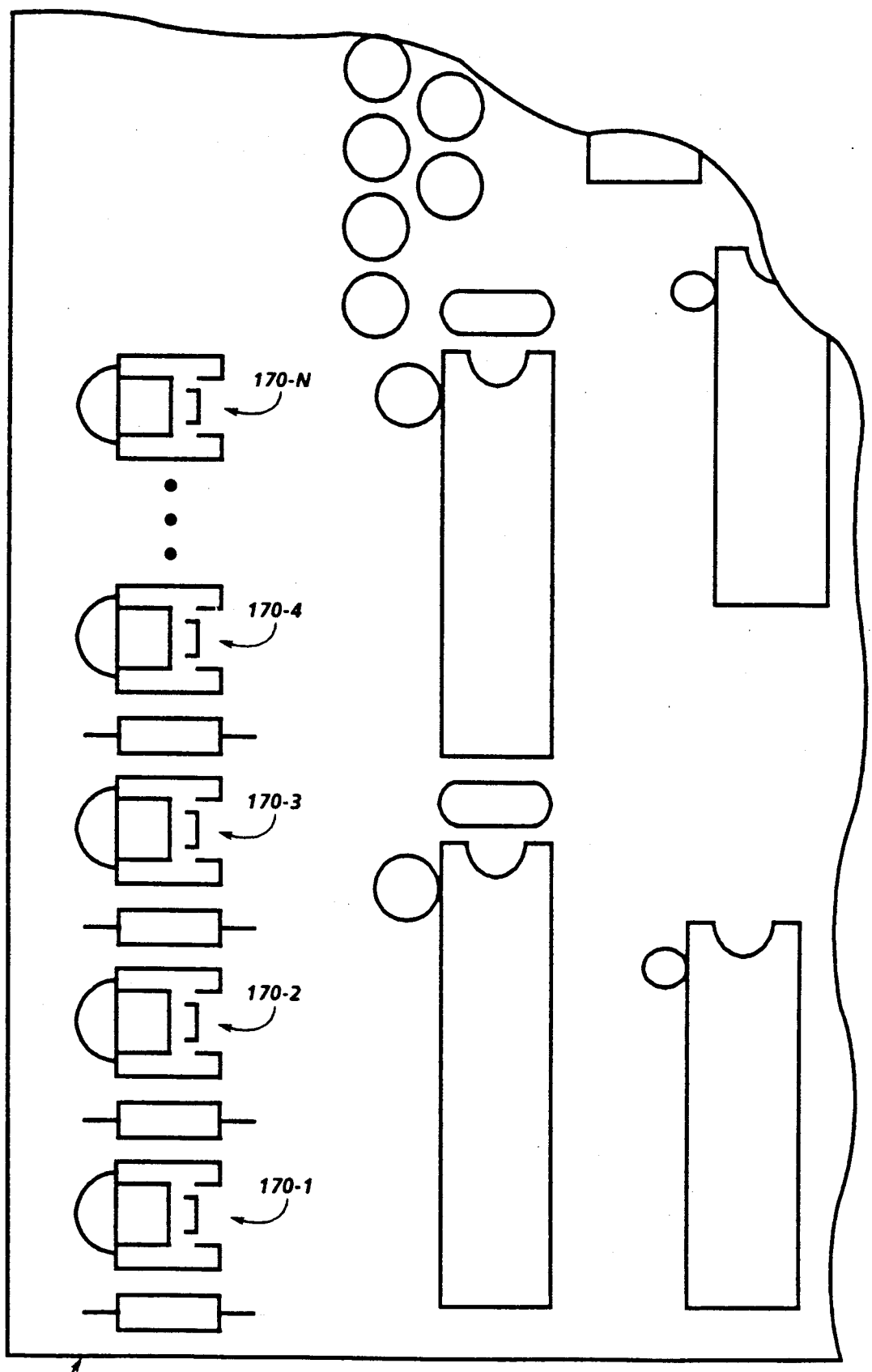
FIG. 5 is a partial view of a core PWB with diagnostic Light Emitting Diodes (LEDs) for visibly identifying PWB related faults.
Figure 7:
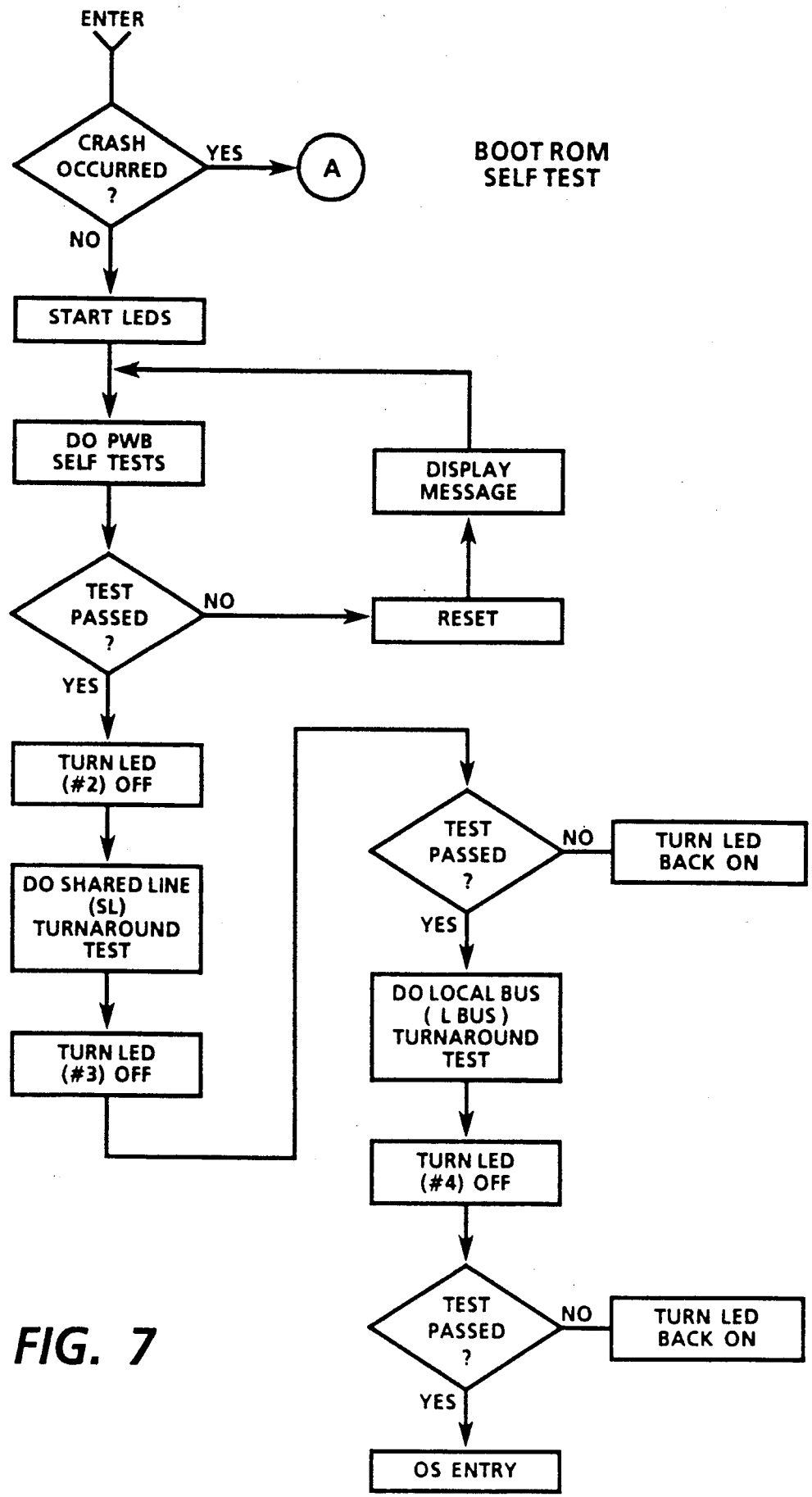
FIG. 7 is a flow chart depicting the Self Test routines for checking the PWBs using LEDs.

Referring now to FIGS. 4 and 5, boot ROM 139 of each core PWB 130, 131, 132, 134 includes a plurality of visible indicators in the form of Light Emitting Diodes (LEDs) 170—1, 170—2, 170—3, 170—4, . . . 170n mounted on each PWB, LEDs 170—1, 170—2, . . . 170n preferably being located on PWBs 130, 131, 132, 134 in a position such that on installation of the PWBs in their respective card cages (not shown), the LEDs are visible to the eye following removal of the appropriate machine covers as during servicing. The number of LEDs 170—1, 170—2, . . . 170n on each core PWB 130, 131, 132, 134 may vary as will be understood.

As used herein, toggling refers to actuating a LED so that the LED changes state, i.e., from an 'off' condition to an 'on' condition or from an 'on' condition to an 'off' condition. Further, messages as used herein refers to byte sized packets of data, such packets each containing address, message, and confirmation bits.

POWER UP

Referring particularly to FIGS. 4-7, each core PWB 130, 131, 132, 134 has a power normal LED 170—1 which is continuously on whenever power is applied to the core PWB. In the event of loss of power in a core PWB, the LED 170—1 for that PWB is turned off, visibly identifying to the machine operator or service representative (referred to herein as a Tech Rep) the type of fault and the core PWB at fault.

Figure 9A:
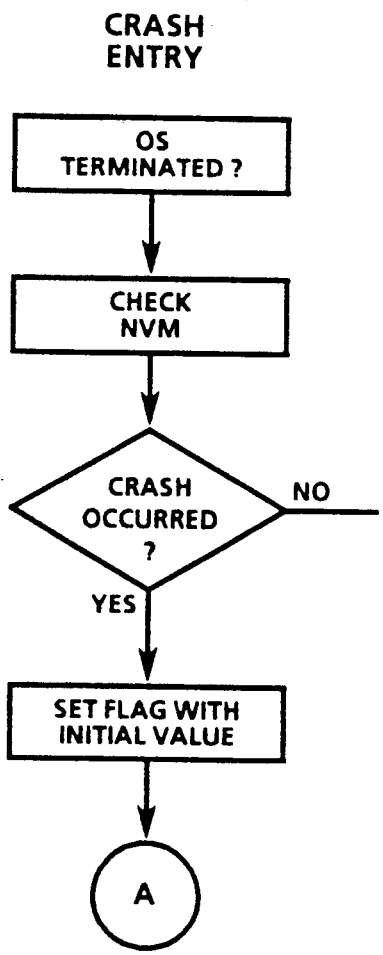
FIGS. 9a, 9b, 9c are flow charts depicting the Crash Entry, Crash Handling and Pulse Fine Code routines for identifying faults.
Figure 9B:
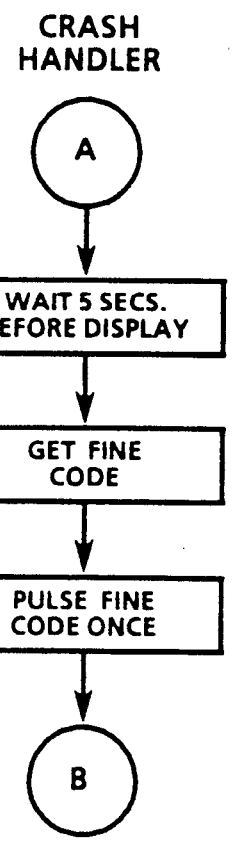
Figure 9C:
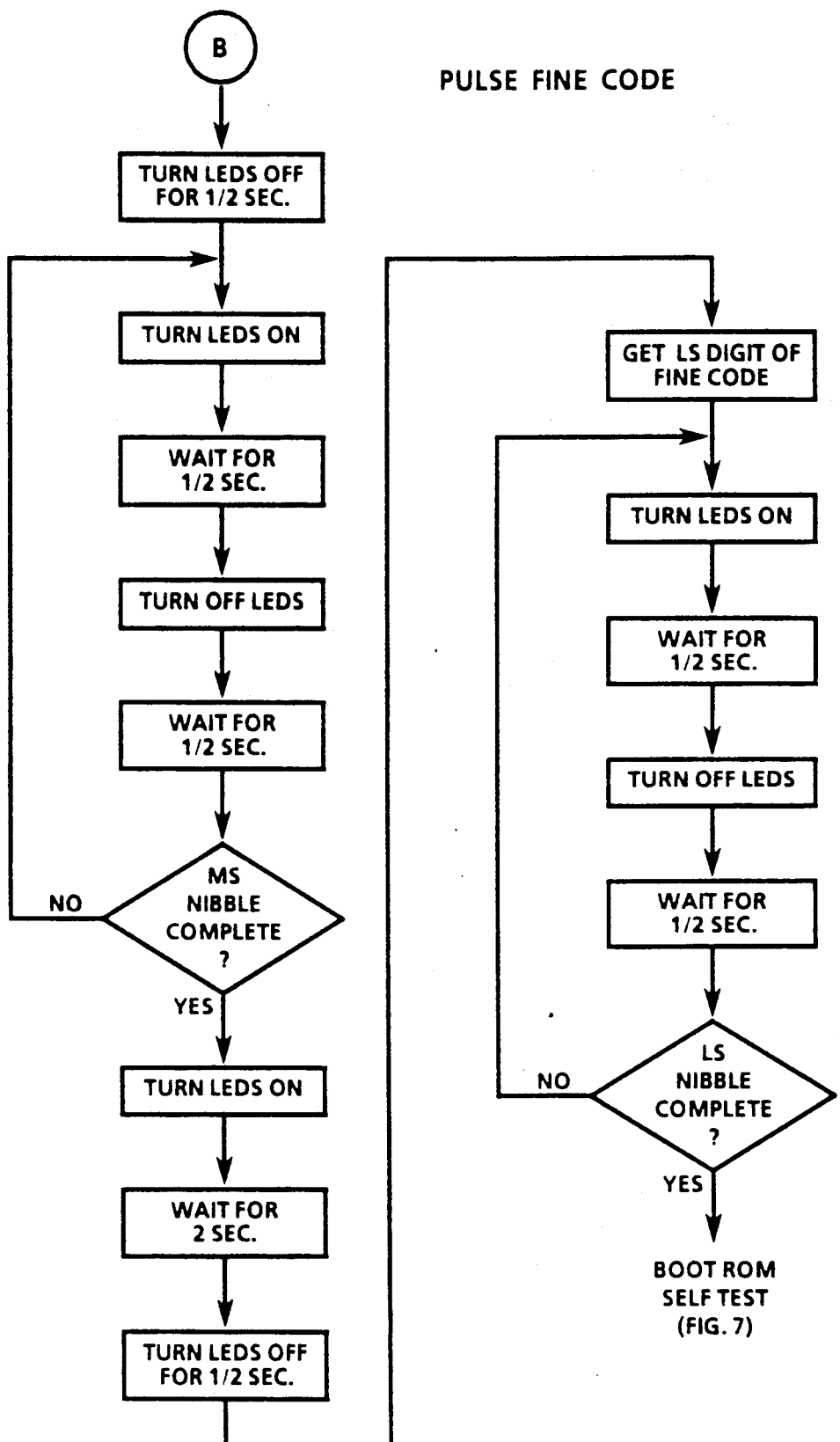

LEDs 170—2, 170—3, 170—4 are software controlled under the "Boot-Self Test" software program [Copyright(®) 1985, 1986, 1987, 1988, Xerox Corporation, All Rights Reserved] of Appendix A. At startup of ROMs 139, as for example during power up, board reset, etc., a check is made to see if a crash occurred (CRASH OCCURRED?). If so, the "CRASH HANDLER" routine of FIG. 9b is entered. In the absence of a crash, LEDs 170—2, 170—3, 170—4 are turned on (START LEDs). Initial core tests of PWBs 130, 131, 132, 134 including Boot Rom self tests are run (DO PWB SELF TESTS). If the tests are completed without fault (TESTS PASSED?), LEDs 170—2 are turned off (TURN LED #2 OFF). If a fault is detected in one of the core PWBs 130, 131, 132, 134, the LED 170—2 for the core PWB that is at fault remains on, identifying the type of fault and particular PWB where the fault exists. The self test routine is reset while a fault message is displayed (DISPLAY MESSAGE) on screen 12 of UI 11.

A shared line turnaround test for each core PWB 130, 131, 132, 134 is run (DO SHARED LINE-SL-TURNAROUND TEST). LEDs 170—3 are turned off if the test passed and no fault is detected (TURN LED #3 OFF). Should a fault be detected, the LED 170—3 for the faulted PWB is turned on (TURN LED BACK ON), visibly indicating the existence of a fault as well as identifying the type of fault and the core PWB at fault.

A local bus turnaround test is run (DO LOCAL BUS-LBUS-TURNAROUND TEST). LEDs 170—4 on each core PWB are turned off if the test passed and no fault is detected (TURN LED #4 OFF). Where a fault is detected, the LED 170—4 for the particular core PWB is turned on (TURN LED BACK ON), visibly identifying the PWB at fault and the type of fault and the crash handler routine is entered to identify the specific fault.

Additional LEDs to identify further faults may be envisioned.

Following successful completion of the self tests and downloading of the operating system, LEDs 170—2, 170—3, and 170—4 are off.

RUNNING

Figure 6:
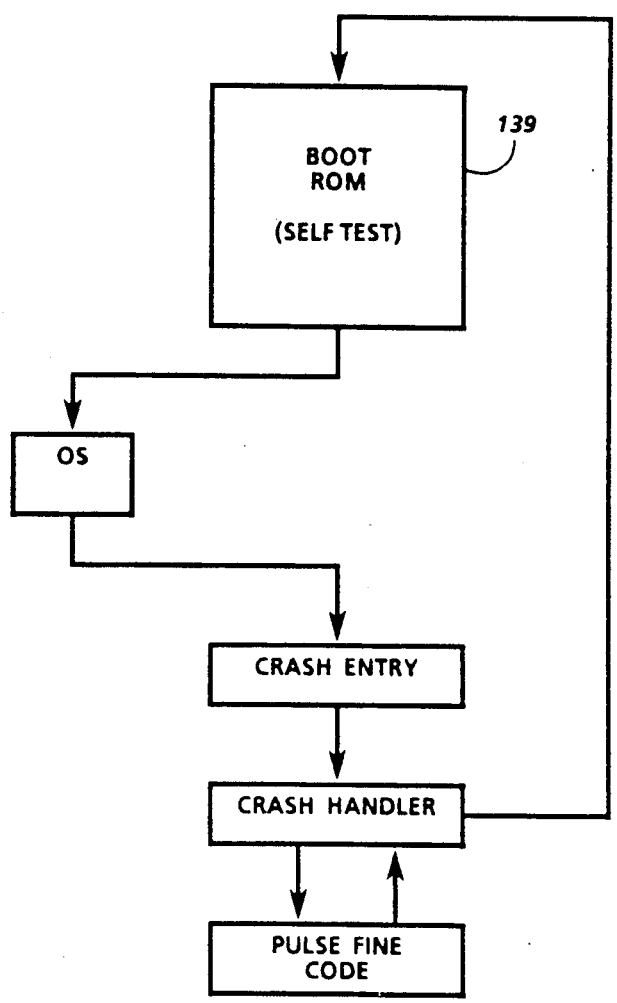
FIG. 6 is a flow chart depicting the overall LED operating software.
Figure 8:
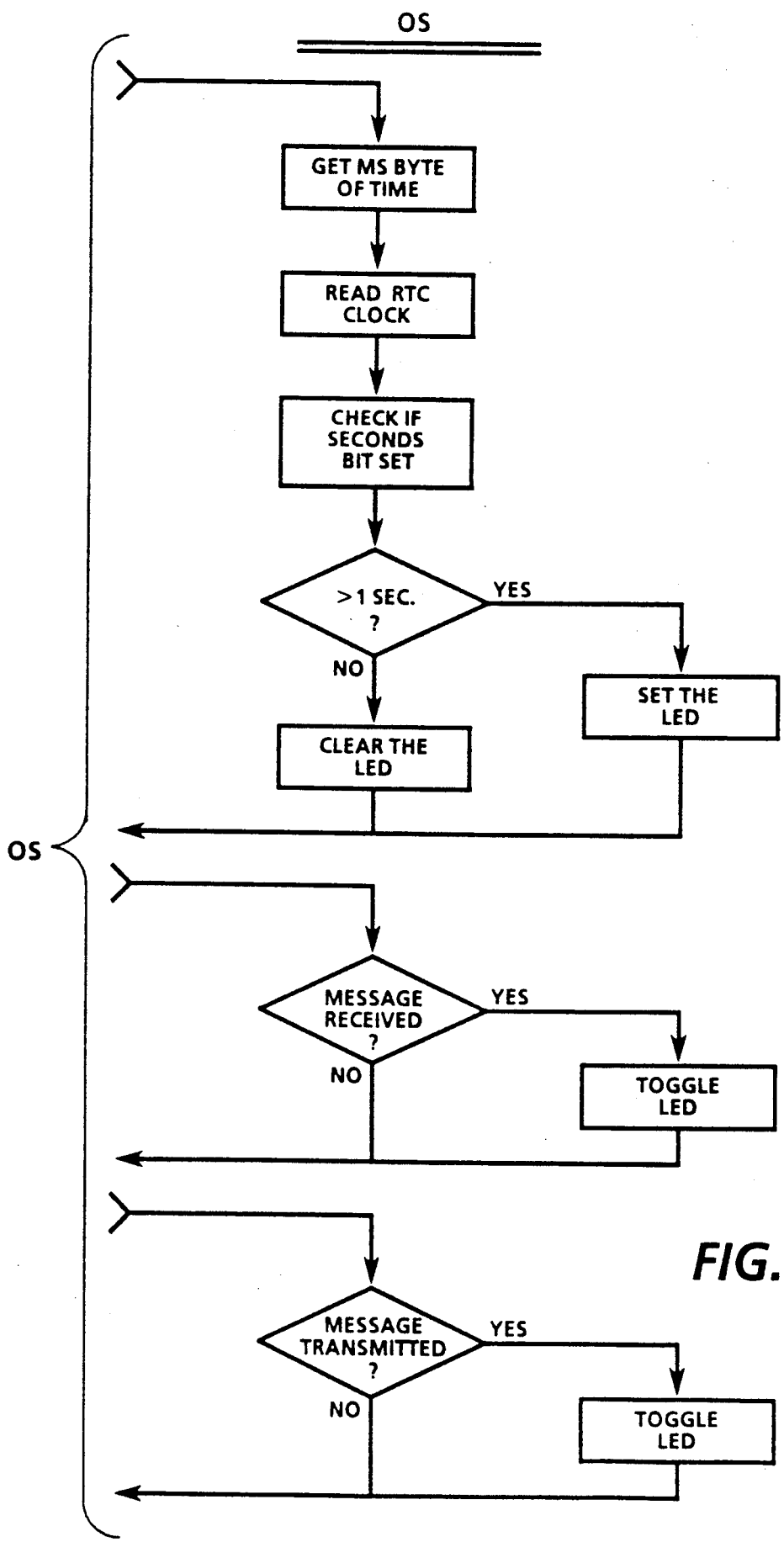
FIG. 8 is a flow chart depicting the Operating System (OS) routines in which LEDs provide heartbeat, message transmitted and message received indications.

Referring particularly to FIGS. 6 and 8, functioning of the OS is continually checked by the software programs "toggle led at a 1 second rate", "toggle led 1 for all messages received . . . ", and "toggle led" (for messages transmitted) [Copyright (®) 1985, 1986, 1987, 1988, Xerox Corporation, All Rights Reserved] of Appendix B. LEDs 170—2 on core PWBs 130, 131, 132, 134 are continuously toggled at a preset rate (i.e., once per sec.) on successful startup and running of the OS. For this, the previously saved reading on the global clock ("get ms byte of time") and the current reading on the global clock (READ RTC CLOCK) are fetched and subtracted from one another ("check if seconds bit set"). Where the difference is equal to or greater than the preset toggling rate (i.e., one sec.), LEDs 170—2 on core PWBs 130, 131, 132, 134 are toggled ("set the LED"). Where the difference is less than the preset toggling rate, the LEDs 170—2 are not ("clear the LED"). Should the OS terminate, this heartbeat like indicator is stopped, permitting ready identification of the problem.

Each time a message is received from SL 125 by one of the core PWBs 130, 131, 132, 134, the LED 170—3 for that PWB is toggled ("toggle LED"). Similarly, each time a message is transmitted by one of the core PWBs 130, 131, 132, 134, over shared line 125, the LED 170—4 on the transmitting PWB is toggled ("toggle led").

It will be understood that as the OS is being downloaded to each PWB 130, 131, 132, 134, the LED 170—3 for that PWB is toggled rapidly since the number and rapidity of the messages received is substantial. As a result, downloading of OS software is readily distinguished from receipt of other messages which tend to be shorter in duration and more intermittent.

TERMINATION

Referring particularly to FIGS. 6 and 9a, 9b, 9c, in the event of termination of the OS due to the occurrence of a crash, the crash handling routines "Crash Entry", "Crash Handler", and "Pulse Fine Code" [Copyright (®) 1985, 1986, 1987, 1988, Xerox Corporation, All Rights Reserved] of Appendix C are called. Entry is through the "Crash Entry" routine (FIG. 9a) which checks the NVM to determine if there was a crash (CRASH OCCURRED). If a crash occurred, the crash occurred flag is set ("set the flag with init value") (FIG. 9a) and the "Crash Handler" routine (FIG. 9b) is entered. The "Crash Handler" routine imposes a preset wait ("wait 5 seconds before display") following which the fine (i.e., crash) code is fetched ("get fine code") and the "Pulse Fine Code" routine called ("pulse fine code once").

The "Pulse Fine Code" routine (FIG. 9c) turns LEDs 170—3 and 170—4 off for a preset interval ("turn the LEDs off for half sec") following which LEDS 170—3 and 170—4 are repetitively turned on and off in half second intervals ("turn LEDs on", "wait for half sec.", "turn off LEDs", "wait for half sec.") a number of times equal to the MS nibble of the fine code. LEDs 170—3 and 170—4 are then turned on ("turn LEDS on") for a preset wait interval ("wait for 2 seconds") following which the LEDs are turned off for a short interval ("turn the LEDs off for half sec"). The LS digit of the fine code is obtained and the LEDs 170—3 and 170—4 are repetitively turned on and off in half second intervals ("turn LEDs on", "wait for half sec.", "turn off LEDs", "wait for half sec.") a number of times equal to the LS nibble of the fine code. By monitoring the on/off cycles of LEDs 170—3 and 170—4, the Tech Rep can read the code signaled by LEDs 170—3 and 170—4 and identify the fault found.

Following crash handling, return is made through the "BootSelf Test" routine (CRASH OCCURRED?-FIG. 7) to the "Crash Handler" routine (FIG. 9b) and the process repeated until the fault is cured.

While LEDs have been shown and described, other suitable light sources may instead be contemplated.

While the invention has been described with reference to the structure disclosed, it is not confined to the details set forth, but is intended to cover such modifications or changes as may come within the scope of the following claims.

We claim:

1. A process for diagnosing and identifying faults in a reproduction machine during operation of said machine, the machine having a plurality of image processing components, an operating system providing control data for operating said components; memory means for storing said operating system; and control means including plural printed wiring boards coupled by a shared line with said memory means for implementing operation of said machine in accordance with said operating system, each of said boards having plural fault indicating lamps thereon, comprising the steps of:
    (a) repeatedly actuating a first of said lamps on each of said boards while said operating system is running;
    (b) repeatedly actuating a second of said lamps on each of said boards at a predetermined rate each time a message is received on said shared line; and
    (c) repeatedly actuating a third of said lamps on said boards at a predetermined rate each time a message is transmitted from said boards to said shared line;
    (d) where a fault in one of said boards is detected,
        (1) identifying said fault by code, and
        (2) pulsing said second and third lamps on said board on and off a number of times equal to said code whereby to identify said code and the fault detected.

2. The process according to claim 1 including the step of:
    continuously actuating a fourth of said lamps on said boards in response to application of power to said boards.

3. A process for diagnosing and identifying faults in a reproduction machine during operation of said machine, the machine having a plurality of image processing components, an operating system providing control data for operating said components; memory means for storing said operating system; and control means including first printed wiring boards coupled to said memory means and each other by a shared line and second printed wiring boards associated with each of said first boards, said second boards being coupled to said first boards and to each other by local buses, each of said first boards having plural fault indicating lamps thereon, comprising the steps of:
    (a) repeatedly actuating a first of said lamps on each of said boards while said operating system is running;
    (b) repeatedly actuating a second of said lamps on each of said boards at a first predetermined rate each time a message is received on said shared line; and
    (c) repeatedly actuating a third of said lamps on said boards at a predetermined rate each time a message is transmitted from said boards to said shared line;
    (d) where a fault in one of said boards is detected,
        (1) identifying said fault by code, and
        (2) pulsing said second and third lamps on said board on and off a number of times equal to said code whereby to identify said code and the fault detected.

4. The process according to claim 3 including the step of:
    continuously actuating a fourth of said lamps on said first boards while power is input to said first boards.

5. The process according to claim 4 including the steps of:
    (a) on startup of said machine, energizing said first, second, third and fourth lamps;
    (b) testing said first boards for faults and where no fault is found, deenergizing said first lamps;
    (c) testing said shared line for faults, and where no fault is found, deenergizing said second lamps;
    (d) testing said local buses for faults, and where no fault is found, deenergizing said third lamps.

* * * * *